Figure 1:
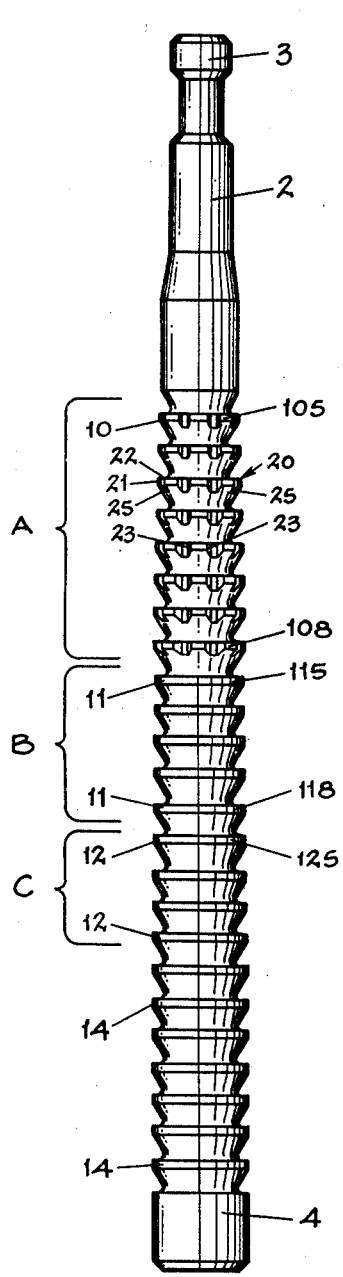

June 30, 1953  F. J. LAPOINTE ET AL  2,643,443
BROACH
Filed Dec. 9, 1950

INVENTORS
Francis J. Lapointe and
BY Elmer J. Lapointe
Freeman Crampton
ATTORNEY Patented June 30, 1953

2,643,443

UNITED STATES PATENT OFFICE 2,643,443

BROACH

Francis J. Lapointe and Elmer J. Lapointe,
Ann Arbor, Mich.

Application December 9, 1950, Serial No. 199,960

3 Claims. (Cl. 29—95.1)

Our invention has to do with broaching. Particularly, our invention relates to a broaching tool.

We have as an objective in making our invention to provide a broaching tool for removing a lot of stock in one pass over the work. A still further objective is to provide a tool having a novel sequence of cutting teeth by which the friction load, resulting heat and required power is reduced, notwithstanding the mass cutting of the tool.

A still further objective of our invention is to provide cutting teeth of novel form by which the cut chip freely moves out of the path of cutting action and into a space of dimensionally greater size. By this provision chip congestion about the tool cutting edge is prevented as might otherwise increase load on the tool and the power requirements to pass it.

More definitely, our invention aims to provide a broach tool having a series of aligned spline cutting teeth with a fast step-up in immediate preceding tandem relation to a series of full cutting teeth of corresponding sharp step-up, the lead-off tooth of each series being of equal cutting height and the last tooth of the full cutting series being succeeded by a succession of teeth of a lightly rising cutting height exceeding the height of any other tooth in either series.

Still more particularly, our invention seeks to furnish a broaching tool having spline cutting teeth in aligned sequence characterized by the fact that the cutting edge of each tooth, successive to the leader or shortest tooth, is less in length than the cutting edge of all preceding teeth. Also our invention seeks to supply a broaching tool having spline cutting teeth in aligned sequence characterized by the fact that the sides of the teeth are inclined to the crown to form teeth of wider root-base than crown and wider lead face than tail. Stated otherwise, the spline cutting teeth of our invention are characterized by the fact that the side of each tooth extends in a plane defining an obtuse angle to the cutting edge as viewed in profile section and an acute angle as viewed in plan.

The invention consists in other features and advantages which will appear from the following description and upon examination of the drawing. Structures containing the invention may partake of different forms and still embody the invention. To illustrate a practical application of the invention, we have selected a broach as an example of the various structures and details thereof that contain the invention. We shall describe the selected structure hereinafter, it being understood that variations may be made without departing from the spirit of the invention. The particular structure selected is shown in the accompanying drawing and described hereinafter.

Figure 2:
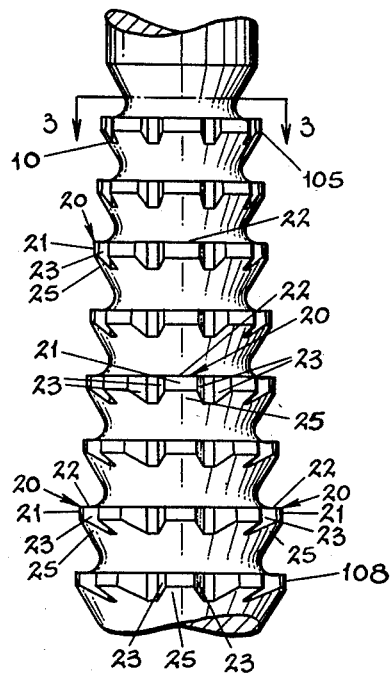
Figure 3:
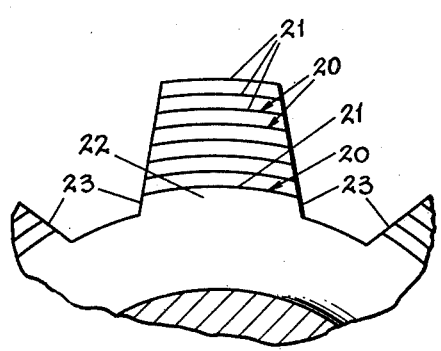

Fig. 1 of the drawing illustrates a view of a side elevation of a broach embodying our invention. Fig. 2 illustrates an enlarged view of the broach section having the series of successive spline cutting teeth. Fig. 3 illustrates an enlarged view of a section, viewed in the plane of the line 3—3 indicated in Fig. 2.

Those skilled in the art immediately recognize that the broach tool shown in the drawing is of the type used generally for internal broaching. However, our invention lends itself to being adapted easily to a surface or external broaching tool, as well as the illustrated internal broaching tool. The adaptation necessary is clearly in the skill of the calling.

The broach shown in the drawing figures has a shank 2 provided at one end with a chucking head 3 and at the other with a butt 4. The teeth of the broach are disposed along the shank 2 between the chucking head and butt. The teeth include those which effect cutting and may also be those which burnish or finish, the latter occurring usually last in sequence along the shank. Our invention is concerned essentially with the cutting teeth. Hence, this description will be correspondingly restricted.

The cutting teeth of a broaching tool embodying our invention comprise three series in tandem immediately succeeding relation. The first series A is that of aligned spline cutting teeth 10 followed by the second series B of full cutting teeth 11. The third series C comprises a plurality of full cutting teeth 12.

The A series teeth 10 are adapted to engage the work and in their pass cut splines or keyways having a guiding and bearing effect on the tool. Also because the teeth 10 are cutting only spline ways and removing less metal than were a full bore to be cut, the depth of cut in a pass or the step-up of the teeth cutting edges may be great, without tool failure.

The series B teeth 11 are adapted to engage the splines left by the pass of the A series teeth. As the B series teeth pass the work, they effect a pick-up, in a sense, of those portions of the work metal left undone by the pass of series A teeth. The series B teeth have the same sharp step-up as that of the series A teeth.

Particularly of importance is the provision by which the lead tooth 115 of the B series teeth 11 is approximately of the same height (measured from the axis of shank 2) as the lead teeth 105 of the A series teeth 10. By reason of this provision, the B series teeth engage the work with the same ease and approach angle as that of the A series teeth. Also the B series teeth will not be unduly burdened.

Also of particular importance the first tooth 125 of the C series teeth 12 is higher than the last teeth 108 and 118 of the A and B series teeth 10. Tooth 125 and its companions 12 have a light rise in step-up and remove thin metal portions from the work bore. By this provision the cut or finished bore surface formed by passing the tool through the work will be devoid of undesired rifling marks or strains from the pass of teeth 10 and 11—as might otherwise be present were the last teeth of both A and B series to produce the finished surface.

The teeth 14 successive to the C series teeth are a series of finishing teeth, well known to the art. Their action on the work is largely that of burnishing.

An important aspect of our invention resides in the relation in shape and size of successive teeth 10 of the A series of spline cutting teeth. These relations are illustrated to good advantage in Figs. 2 and 3 of the accompanying drawing. Examination of these drawing figures shows that each tooth 10 has a cutting edge 20. The cutting edge 20 occurs along the vertex line or conjunction of a crown surface 21 and lead face surface 22 of each tooth.

Each tooth 10 has side surfaces 23, each of which extends in a plane defining with the cutting edge 20 an obtuse angle, when viewed in profile section (Fig. 3), and an acute angle, when viewed in plan (Fig. 2).

Hence, by this provision, the teeth 10 have a wider root-base than crown. In the wider root-base, a space near the tooth root into which cut chip from the action of each tooth's cutting edge 20 may pass is provided. The provision of this chip receiving space near the tooth root enables diversion of the chip from interference with the cutting action of the tool edge 20. This enables the use of less power in passing the tool in its working stroke.

Also by the provision of side surfaces 22 on the teeth which bear an acute angle to the tooth cutting edge 20 (Fig. 2), relief from frictional contact between the work and tooth side surfaces 23 in the pass of the tool occurs. It will be seen from Fig. 2 of the drawing that the lead face surface 22 is wider than tail face surface 25 of the tooth. Thus, the cut made by the cutting edge 20 in the work exceeds in width the space required to pass the tooth side surfaces 23; and there will be reduced rubbing and friction as a consequence.

Another important aspect of our invention is that we provide aligned teeth 10 in which the cutting edges 20 are progressively shorter in successive teeth following the lead teeth 105. Thus the pass of the teeth 10 of the A series teeth causes a progressively deeper but narrower cut to be made in the work. By this provision and that of the inclined tooth side surfaces 23, the area of surface contact between side surfaces 23 of successive teeth and the work surface cut by preceding teeth is materially reduced to a line contact. This is sufficient to ground the broach in the work for guidance therethrough with a minimum of friction during the pass.

While we have illustrated and described the best form of our invention now known to us, as required by the statutes, those skilled in the art will readily understand that changes may be made in the disclosed construction without departing from the spirit of our invention as set forth in the appended claims.

We claim:

1. An internal broach having a leading end and annular sets of segmental teeth, the height of teeth in each set being different from that of teeth in other sets and the sets being in succession along the broach longitudinal axis with the set of shortest teeth first and sets of longer teeth next and certain teeth of all sets in alinement and each segmental tooth bearing a cutting edge, the teeth being characterized by the fact that the cutting edge of each tooth of each set, rearwardly successive to the set of shortest teeth, arcuately curves about the broach longitudinal axis a lesser number of degrees than the cutting edge of teeth of the next forwardly preceding set.

2. A broach having a leading end and a plurality of metal cutting teeth of various heights in lineal succession rearwardly along the broach and characterized by the fact that the sides of each tooth are plane surfaces convergent toward each other in the direction of the next successively rearward tooth on the broach.

3. A broach having a leading end and a plurality of teeth of various lengths of cutting edge in lineal succession rearwardly along the broach and characterized by the fact that the sides of each tooth are plane surfaces convergent toward each other from opposite ends of the tooth cutting edge and toward corresponding opposite ends of the cutting edge of the next successively rearward tooth.

FRANCIS J. LAPOINTE.
ELMER J. LAPOINTE.

References Cited in the file of this patent

UNITED STATES PATENTS

| Number | Name | Date |
|---|---|---|
| 401,987 | Waterman | Apr. 23, 1889 |
| 685,772 | La Pointe | Nov. 5, 1901 |
| 2,041,759 | Halborg | May 26, 1936 |
| 2,161,901 | Praeg | June 13, 1939 |
| 2,209,026 | Kaplan et al. | July 23, 1940 |

FOREIGN PATENTS

| Number | Country | Date |
|---|---|---|
| 409,375 | Great Britain | Apr. 30, 1934 |